United States Patent

Morrison et al.

[15] 3,668,263

[45] June 6, 1972

[54] ORGANOLITHIUM POLYMERIZATION INITIATORS AND USE THEREOF IN POLYMERIZATION PROCESSES

[72] Inventors: Robert C. Morrison; Conrad W. Kamienski, both of Gastonia, N.C.

[73] Assignee: Lithium Corporation of America, New York, N.Y.

[22] Filed: Jan. 19, 1970

[21] Appl. No.: 4,126

[52] U.S. Cl. ......................260/665 R, 252/431 R, 260/83.7, 260/94.2 M, 260/94.6, 260/669 R, 260/680 R
[51] Int. Cl. ..........................................C07f 1/02, C08d 3/04
[58] Field of Search ..............................................260/665 R

[56] References Cited

UNITED STATES PATENTS

| | | | |
|---|---|---|---|
| 3,301,840 | 1/1967 | Zelinski | 260/94.2 M |
| 3,308,170 | 3/1967 | Pritchett et al. | 260/665 R |
| 3,402,159 | 9/1968 | Hsieh | 260/85.1 |
| 3,452,111 | 6/1969 | Kamienski et al. | 260/665 R |
| 3,492,369 | 1/1970 | Naylor | 260/879 |

OTHER PUBLICATIONS

Coates et al. Organometallic Compounds, Methuan and Co., Ltd., London, Vol. II, p 18– 20 (third edition 1967).

Primary Examiner—Tobias E. Levow
Assistant Examiner—A. P. Demers
Attorney—Wallenstein, Spangenberg, Hattis & Strampel

[57] ABSTRACT

Polymerization initiator compositions comprising reaction products of $C_2$–$C_{12}$ alkyllithiums with monomers from the group of polymerizable conjugated dienes and polymerizable vinyl-substituted aromatic compounds in a medium of aliphatic, cycloaliphatic or aromatic hydrocarbons and/or aliphatic tertiary monoamines or aryl ethers, the conjugated diene and vinyl-substituted aromatic compound portion of said initiator compositions being relatively nonpolymeric. Such initiator compositions are highly effective for the productions of polymers of conjugated dienes and/or vinyl-substituted aromatic compounds.

24 Claims, No Drawings

ORGANOLITHIUM POLYMERIZATION INITIATORS AND USE THEREOF IN POLYMERIZATION PROCESSES

This invention relates to the preparation of novel polymerization initiators and to the use thereof for the production of polymers of conjugated dienes and/or vinyl-substituted aromatic compounds. The novel initiators of the present invention are derived from $C_2$–$C_{12}$ alkyllithiums and polymerizable conjugated dienes and/or polymerizable vinyl-substituted aromatic compounds, especially polymerizable vinyl-substituted aromatic compounds which are reacted in a manner described hereafter in detail in a medium of aliphatic, cycloaliphatic or aromatic hydrocarbons and/or aliphatic tertiary monoamines or aryl ethers.

It has heretofore been known, as shown in U.S. Pat. No. 3,377,404, to prepare alkyllithium initiators, for use in the polymerization of conjugated dienes and vinyl-substituted aromatic compounds, by a procedure comprising initially preparing an organo polylithium polymerization initiator in a polar solvent, such as diethyl ether, then solubilizing said initiator by reacting the same with a small amount of a conjugated diene, then replacing a substantial portion of the polar solvent with a hydrocarbon diluent, and thereafter contacting the solubilized organo polylithium initiator with a conjugated diene in the hydrocarbon diluent substantially reduced in polar solvent content to effect polymerization of said conjugated diene. The objective is to make conjugated diene polymers or copolymers of conjugated dienes with vinyl-substituted aromatic compounds with low viscosities and with narrow molecular weight distribution. A particular advantage of using said known initiators is that the usual initiation step in polymerization is avoided, propagation proceeding directly to produce largely monodisperse polymers. These initiators, in the form of adducts, can be prepared in a hydrocarbon medium in the presence or absence of aliphatic or cycloaliphatic ethers. In the absence of ethers, the adducts, as heretofore prepared, possess a relatively high molecular weight and are soluble in the medium only in relatively low concentration. On the other hand, when prepared in the presence of said ethers, the adducts, when used as catalysts for the polymerization of 1,3-conjugated dienes, do not produce the desired high 1,4-polymer microstructure. Thus, addition of alkyllithium compounds to, for example, doubly-substituted vinyl aromatic compounds, as heretofore carried out, produces only higher molecular weight polymers or necessitates the presence of undesirable ethers to produce adducts of reasonably low molecular weight and high solubility.

Our present invention is sharply distinguished from that of said U.S. Pat. No. 3,377,404, in that, among other things, it is wholly unnecessary and, indeed, is most desirably expressly avoided, initially to form an organo polylithium polymerization initiator in a polar solvent followed by the procedures referred to above in said patent. In addition, as will be shown in detail below, the initiator compositions of the present invention distinguish in structure and properties from those of the aforesaid patent.

The present invention relates to the production of novel initiator compositions, in the form of certain adducts, wherein the reaction rate between the alkyllithium and the polymerizable conjugated diene monomer or vinyl-substituted aromatic compound monomer is materially increased without the use of alkyl or cycloalkyl ethers, and adducts of higher molarity, based on the lithium, are obtainable than are otherwise obtained, as described above, by keeping polymerization at a minimum.

Accordingly, an object of this invention is the production of new and improved alkyllithium adducts of polymerizable conjugated dienes or of vinyl-substituted aromatic compounds which are soluble in relatively high molar concentration in a hydrocarbon medium free of aliphatic or cycloaliphatic ethers.

Another object of this invention is to provide new and useful di- and poly-functional alkyllithium adducts of polymerizable conjugated dienes or of vinyl-substituted aromatic compounds.

Another object of this invention is to provide an improved process for increasing the reaction rate in the preparation of such alkyllithium initiators or adducts to such an extent that little or essentially no polymerization or oligomerization of monomer occurs.

Still another object is to provide an improved process for preparing conjugated diene and vinyl-substituted aromatic polymers and copolymers.

Further objects, advantages and features of our invention will be apparent from the following disclosures.

We have found that new and improved polymerization initiator compositions or adducts, of extremely low molecular weight and capable of polymerizing conjugated dienes and/or vinyl-substituted aromatic compounds to polymers of relatively low vinyl content, can be prepared by the gradual and controlled admixture of a polymerizable conjugated diene monomer or of a vinyl-substituted aromatic compound with an alkyllithium compound, in a medium as described in detail below, and, more particularly, by the gradual and controlled addition of said polymerizable monomer to a liquid hydrocarbon medium containing an alkyllithium and varying amounts of an aliphatic tertiary monoamine and/or aryl ether activator. In fact, the solvent medium may be pure solely aliphatic tertiary monoamine or solely aryl ether, although this is generally not preferable. We have further found that not only is the reaction rate increased in the formation of the adduct, but it is possible to obtain adducts of exceptionally high molarity, based on the lithium, this latter effect being realized by keeping polymerization of the diene and/or vinyl-substituted aromatic compound at a low value or a practical minimum. Thus, in the initiators of our invention, the monomeric character of the monomer portion thereof is most desirously obtained although dimerization of the monomer may be present to a greater or lesser extent. Essentially all of the alkyllithium employed should be used up in the production of the initiator so that there is no or essentially no free alkyllithium present. Polymerization proper of the monomer is to be avoided in the production of the initiator and, in this connection, it may be noted that dimerization is not considered to be included within the meaning of the term "polymerization."

The reaction temperatures at which the initiators are produced are variable but, generally speaking, low temperatures are used, usually in the range of about −60° C to not substantially in excess of ambient temperatures, particularly desirably being temperatures in the range of about 0° C to −30° C.

Initiators or adducts made in accordance with the present invention are characterized by substantial uniformity. Thus, in the case of a single (or mono-) addition of alkyllithiums to each vinyl substituent on benzene, adducts are obtained with little or no concomitant oligomerization or polymerization of the vinylbenzene. Vinylbenzenes such as styrene and meta-divinylbenzene have a high propensity toward polymerization in the presence of alkyllithium catalysts. Adducts made in accordance with our invention can be prepared quite economically, utilizing a minimum of conjugated diene monomer or vinyl-substituted aromatic compound monomer, and, in use for polymerizing such monomers, they contribute little or insignificantly to the polymers resulting from their use as initiators or catalysts. Moreover, as will be shown below, difunctional or polyfunctional initiators or catalysts can be prepared as readily as those of monofunctional character. Such difunctional initiators or catalysts can be used to produce "self-vulcanized" tri-block polymers of predetermined molecular weight which are useful in producing various elastomeric rubbery products by molding an extrusion techniques.

The amount of the hydrocarbon reaction medium which is employed in carrying out the production of the initiator is variable but, generally speaking, it will usually fall within the range of about 5 to 100 moles of the hydrocarbon to 1 of the alkyllithium.

The amount of tertiary monoamine and/or aryl ether employed in the preparation of the alkyllithium adducts of this invention is variable and will usually fall within the range of about 0.01 to 10 equivalents per equivalent of alkyllithium utilized, and preferably from 0.2 to 2 equivalents per equivalent of alkyllithium when the solvent medium is a liquid hydrocarbon.

Polymerizable conjugated dienes employed in the production of the initiators or adducts of this invention are 1,3-conjugated dienes containing from four to 12, inclusive, carbon atoms per molecule. Examples thereof include the following: 1,3-butadiene: isoprene; 2,3-dimethyl-1,3-butadiene; 1,3-pentadiene (piperylene); 2-methyl-3-ethyl-1,3-butadiene; 3-methyl-1,3-pentadiene; 1,3-hexadiene; 2-methyl-1,3-hexadiene; and 3-butyl-1,3-octadiene. Among the dialkylbutadienes, it is preferred that the alkyl groups contain from 1 to 3 carbon atoms. Numerous others are disclosed, for instance, in U.S. Pat. No. 3,377,404, the disclosure with respect to which is incorporated herein by reference.

In addition to or in place of the above described conjugated dienes, polymerizable vinyl-substituted aromatic compounds can be combined with alkyllithium compounds to form polymerization initiators or adducts. These compounds include styrene; alphamethylstyrene; 1-vinylnaphthalene; 2-vinylnaphthalene; 1-alphamethylvinylnaphthalene; 2-alphamethylvinylnaphthalene; 1,2-diphenyl-4-methylhexene-1; 1,6-diphenyl-hexadiene-1,5; 1,3-divinylbenzene; 1,3,5-trivinylbenzene; 1,3,5-triisopropenyl-benzene; 1,4-divinylbenzene; 1,3-distyrylbenzene; 1,4-distyrylbenzene; 1,2-distyrylbenzene; and mixtures of these, as well as alkyl, cycloalkyl, aryl alkaryl and aralkyl derivatives thereof in which the total number of carbon atoms in the combined hydrocarbon constituents is generally not greater than 12. Examples of these latter compounds include: 3-methylstyrene; 3,5-diethylstyrene; 2-ethyl-4-benzylstyrene; 4-phenylstyrene; 4-p-tolylstyrene; 2,4-divinyltoluene; 4,5-dimethyl-1-vinylnaphthalene; 2,4,6-trivinyltoluene; and 2,4,6-triisopropenyltoluene. Again, reference is made to U.S. Pat. No. 3,377,404 for disclosures of additional vinyl-substituted aromatic compounds which are incorporated herein by reference.

Especially satisfactory for the production of the initiators are meta-divinylbenzene and styrene.

In describing our invention, the polymerizable conjugated dienes and vinyl-substituted aromatic compounds are generically, and for simplicity, sometimes referred to as "monomers."

The alkyllithiums which are adducted with the monomers to produce initiators or adducts in accordance with the present invention are generally in the $C_2$—$C_{12}$ range and include, for example, ethyllithium, n-propyllithium, isopropyllithium, n-butyllithium, isobutyllithium, sec-butyllithium, tert-butyllithium, n-amyllithium, isoamyllithium, sec-amyllithium, and tert-amyllithium. Of especial utility are secondary and tertiary alkyllithiums such as isopropyllithium, sec-butyllithium, tert-butyllithium. While, in the broader aspects of the present invention, the mole ratio of monomer to alkyllithium used in the production of the novel initiators or adducts may be varied from 1 to 100 of the monomer to 1 of the alkyllithium, and preferably from 1 to 10 of the monomer to 1 of the alkyllithium, a particularly important mole ratio range being from 1 to 2 of the monomer to 1 of the alkyllithium.

The aliphatic tertiary monoamine activators are generally low molecular weight trialkylamines possessing no methyl groups, and they include, by way of example, triethylamine, tri-n-propyl-amine, tri-isopropylamine, ethyldi-n-propylamine, diethyl-n-butyl-amine, and triisobutylamine. Arylalkyl tertiary monoamines may also be used, illustrative of which are dimethylaniline, diethylaniline, diisopropylaniline, and methylisobutylaniline. Aryl ethers which function as activators which do not produce a high vinyl microstructure in polydienes produced with the novel adducts of this invention may also be used in place of or in conjunction with the aliphatic tertiary monoamines. These are alkylarylethers such as anisole, ethylphenylether, isopropyl phenylether, dibenzylether and n-butylphenylether and diarylethers, such as diphenyl ether, di-p-tolyl ether, and phenyl-o-tolyl ether. Especially satisfactory are triethylamine, dimethylaniline and anisole.

The hydrocarbon solvent media which may be, and, generally, advantageously are employed are normally liquid alkanes and cycloalkanes such as n-pentane, n-hexane, n-heptane and cyclohexane, and normally liquid aromatic hydrocarbons such as benzene, toluene, xylene, ethylbenzene and pseudocumene, as well as various mixtures of these types. The concentration range of the adducts in solution may be varied widely, with solutions containing between about 0.5 and 2 equivalents of adduct, based on lithium, being particularly desirable.

The addition of alkyllithiums to the monomer or monomers can be controlled to give exclusively 1:1 adducts based on the alkyllithium and activated vinyl groups present. Thus, for example, addition of styrene to a solution of sec-butyllithium in hexane containing an equivalent of triethylamine at 0° C results in the formation of approximately 97 mole percent of 1-Lithio-3-Methylpentylbenzene:

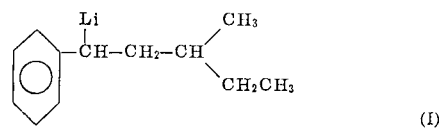

(I)

Surprisingly, such adduct control can even be extended to additions to di- and polyvinyl-substituted aromatic compounds. Thus, for example, addition of meta-divinylbenzene to a solution of sec-butyllithium in hexane containing half an equivalent of triethylamine at −20° C results in the formation of approximately 97 mole percent of 1,3-Bis-(1-Lithio-3-Methylpentyl)-Benzene:

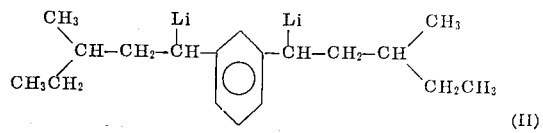

(II)

The foregoing (I) and (II) adducts possess a high solubility in hydrocarbon solvents. The (II) adduct is difunctional and has marked utility in preparing tri-block rubbery polymers.

The mono- and difunctional adducts of alkyllithiums and monomers in which the adduct is the result of the addition of one alkyl group originally present in the alkyllithium per activated vinyl group originally present in the monomer, and particularly the difunctional adducts are especially valuable initiators. Illustrative examples of such adducts, in addition to those mentioned above, are 1-lithio-5-methylheptene-2; 3-lithiomethyl-4-methylhexene-1; 1-lithio-3,5-dimethylheptene-2; 3-lithiomethyl-2,4-dimethylhexene-1; tris-1,3,5-(1-lithio-1,3-dimethylpentyl)-benzene; and 1,4-bis-(1-lithio-3-methylpentyl)-benzene.

The monomers which can be polymerized in the presence of the alkyllithium adducts of our invention are polymerizable conjugated dienes containing from four to 12 carbon atoms, preferably four to eight carbon atoms per molecule, and polymerizable vinyl-substituted aromatic compounds. Examples of these conjugated dienes are the same as those given in regard to the monomers used in the initiator preparation. In addition, the above conjugated dienes containing substituents along the chain can also be employed, such as, for example, halogenated and alkoxy-substituted conjugated dienes such as chloroprene; fluoroprene; 2-methoxy-1,3-butadiene; 2-ethoxy-3-ethyl-1,3-butadiene, and the like. Of the conjugated dienes, the particularly preferred monomers are 1,3-butadiene, with isoprene and piperylene also being especially suitable. The conjugated dienes can be polymerized alone or in admixture with each other to form copolymers or by charging the dienes sequentially to form block copolymers. The vinyl-substituted aromatic compounds, which may be polymerized as such, or which can be copolymerized with the dienes, include those mentioned above, such as styrene, 1-vinylnaphthalene, 2-vinylnaphthalene, as well as the alkyl, cycloalkyl, aryl, alkaryl, aralkyl, alkoxy, aryloxy, and dialkylamino derivatives thereof in which the total number of carbon atoms in the combined substituents is generally not greater than 12, examples of such derivatives being 3-vinyltoluene; 4-phenylstyrene; 4-cyclohexylstyrene; 4-p-tolylstyrene; 3,5-diphenylstyrene; 4-methoxystyrene; 4-dimethylamino-styrene; 3,5-diethylaminostyrene; 3-ethyl-1-vinylnaphthalene; 6-cyclohexyl-1-vinyl-naphthalene; 6-benzyl-2-vinylnaphthalene; 4-methoxy-1-vinylnaphthalene; 6-phenoxy-1-vinylnaphthalene, and the like. The vinyl-substituted aromatic compounds can be copolymerized with the conjugated dienes to form random or block copolymers. Generally, the presence of trialkyl monoamines or dialkylanilines, or diarylethers and alkylarylethers preferably in limited amounts, does not adversely affect the microstructure of the resulting polydiene polymers, which is in marked contrast to the adverse effects of the presence of simple alkyl or cycloalkyl ethers such as diethyl ether or methyl cyclohexyl ether.

In one aspect of the practice of our invention, polar monomers can be employed to form block copolymers with the conjugated dienes. The polar monomer is charged after the conjugated diene has polymerized. Among the polar monomers applicable are for instance, vinylpyridines and vinylquinolines in which the vinyl group is positioned on a ring carbon other than a beta carbon with respect to the nitrogen. These pyridine, quinoline and isoquinoline derivatives can carry substituents such as alkyl, cycloalkyl, aryl, alkaryl, aralkyl, alkoxy, aryloxy and dialkylamino groups, the total number of carbon atoms in the combined substituents being generally not greater than 12. Also, there should be no primary or secondary alkyl groups on ring carbons in the alpha and gamma positions with respect to the nitrogen. Examples of these heterocyclic-nitrogen polar monomers are 2-vinylpyridine; 4-vinylpyridine; 3,5-diethyl-4-vinylpyridine; 5-cyclohexyl-2-vinylpyridine; 3-benzyl-4-vinylpyridine; 6-methoxy-2-vinylpyridine; 3,5-dimethyl-4-dimethylamino-2-vinylpyridine; 2-vinylquinoline; 1-vinylisoquinoline; 3-methyl-4-ethoxy-2-vinylquinoline; 3-dimethylamine-3-vinylisoquinoline, and the like. Still other polar monomers which can be utilized include acrylic and alkacrylic acid esters, nitriles, and N,N-disubstituted amides, such as methyl acrylate, methyl methacrylate, butyl methacrylate, acrylonitrile, methacrylonitrile, N,N-dimethylacrylamide, N,N-diethylmethacrylamide, vinylfuran and N-vinylcarbazole.

Our invention makes possible, readily and simply, the production of polymers and copolymers, for instance, 1,3-butadiene polymers and copolymers of 1,3-butadiene and styrene, said polymers possessing a high proportion of 1,4 links, and the central polybutadiene blocks of said copolymers possessing a high proportion of 1,4 links, not substantially less than 75 percent and, better still and commonly, 85 percent and higher.

Illustrative, non-limiting examples of the practice of our invention are set out below. Numerous other examples can readily be evolved in the light of the guiding principles and teachings contained herein. All temperatures recited are in degrees Centigrade.

EXAMPLE 1

PREPARATION OF 1,3-BIS-(1-LITHIO-3-METHYLPENTYL)-BENZENE 60 ml of a 1.82N sec-butyllithium solution in hexane (0.109 moles) and 6.8 ml (4.9 g — 0.049 moles) of triethylamine were charged to a dry, argon-flushed, 250 ml 3-necked reaction flask. The reaction flask was equipped with stirrer, thermometer, addition funnel and a dry ice-hexane cooling bath. The flask and contents were cooled to −20° and meta-divinylbenzene (M—DVB) (6.3 g — 0.049 moles) diluted with 50 ml hexane was added dropwise over a period of 30 minutes. The reaction temperature was held between −20° and −25° throughout the M-DVB addition and for 2 hours longer. Gas-liquid chromatographic analysis of an active and a hydrolyzed sample of the reaction mixture revealed virtually no sec-butyllithium or M—DVB and the presence of one major and one minor product. A volume of 112 ml of a clear, deep red solution was found to be 0.96 N, while the active carbon-lithium content was 0.95 N (99 percent carbon-lithium active product). 45 ml of the product was hydrolyzed with dilute aqueous HCl. The organic layer was collected, dried and distilled using a vacuum micro-distillation apparatus. Gas-liquid chromatographic analysis of the organic layer prior to fractionation showed the presence of two components (designated A and B) in a weight ratio of 88 to 12. Two fractions were obtained after solvent removal and fractionation under reduced pressure. The first fraction, containing 95 percent of a component A and 5 percent of component B, boiled at 290° (corrected to 760 mm), and possessed a molecular weight (VPO) of 257. The second fraction, containing 86 percent of component B and 14 percent of component A, boiled at 540° (corrected to 760 mm) and possessed a molecular weight (VPO) of 385. Since the first fraction was contaminated with 5 percent of component B, the molecular weight of component A was corrected to 252 by utilizing the known molecular weight of fraction B. The theoretical molecular weight for 1,3-bis-(3-methylpentyl)benzene is 246. The NMR spectrum of the first fraction exhibits a singlet at 6.95δ (4H-phenyl), a triplet at 2.55δ (J=7 cps) (4H's - benzylic methylene), a multiplet between 1.1 and 1.75 centered at 1.4δ (8H - aliphatic methylene + 2H - methine) and an overlapping doublet and triplet centered at 0.95 and 0.90δ (12H - methyl). The above NMR spectrum confirms the identity of component A to be 1,3-bis-(3-methylpentyl) benzene. Component B was tentatively identified as 3-methyl-5,7-di-[m-(3methylpentyl)-phenyl] heptane, the hydrocarbon analogous to the product of the addition of the dilithio analog of component A to m-vinyl-(1-lithio-3-methylpentyl)-benzene.

Carbonation of 50 ml of the product solution yielded 8.3 g of an acid salt [theory for free acid (see below)= 8.3 g]. A neutralization equivalent (N.E.) of 163 was obtained on the free acid. The theoretical N.E. for 1,3-bis-(1-carboxy-3-methylpentyl) benzene is 167. 90 milliequivalents of the product were reacted with 180 moles of trimethylchlorosilane. The trimethylsilyl derivatives were isolated by high vacuum microdistillation. Fraction 1 boiled at 335°, while fraction 2 boiled above 500° (both b.p.'s corrected to 760 mm). Carbon, hydrogen and silicon analyses on fraction 1 showed the presence of two trimethylsilyl groups in the product and the product to be 1,3-bis-(1-trimethylsilyl-3-methylpentyl)-benzene. Calc'd: Si = 14.37%, C = 73.76%, H = 11.87%. Found: Si= 14.01%, C= 73.38%, H= 12.05%.

NMR analysis of the first fraction exhibits a multiplet at 7.1 (4 aromatic H's), a triplet centered at 2.1δ (2 α-methine H's), a singlet at 0.9δ (12-methyl hydrogens), a singlet at 0.05δ (18 trimethylsilyl H's) and a broad multiplet centered at 1.4δ (8 methylene H's and 2 methine H's). The above NMR spectrum confirms the identity of fraction 1 to be 1,3-bis-(1-trimethylsilyl-3-methyl-pentyl) benzene. These derivatives corroborate the identity of the adduct as being 1,3-bis-(1-lithio-3-methylpentyl)benzene.

EXAMPLE 2

PREPARATION OF 1-LITHIO-3-METHYLPENTYLBENZENE 110 ml of 1.82 N sec-butyllithium in hexane (0.2 moles), 30 ml (0.22 moles) of triethylamine, and 50 ml of n-hexane were charged to a 500 ml, 3-necked reaction flask equipped as above. The flask and contents were cooled to 0° and 21 ml of styrene (0.2 moles), diluted with 50 ml of hexane, was added slowly over a period of 1 hour. The reaction temperature was held at 0° throughout the styrene addition and for 1 more hour afterwards. An intense, carmine-red solution was obtained as the final product which was identified as 1-Lithio-3-Methylpentylbenzene. Gas-liquid chromatographic analysis of the hydrolysis products of the reaction mixture revealed the absence of sec-butyllithium and the presence of one major and one minor new component. The major new component, constituting 97 mole percent of the product mixture, was found after fractional distillation to be 3-methylpentylbenzene, b.p. 195°–205°. Its NMR spectrum exhibited absorptions at 7.12$\delta$ (singlet – 5 phenyl hydrogens), 2.52$\delta$ (triplet-2 benzylic hydrogens – J = 7.5 Hz.), 1.05–1.70$\delta$ (multiplet – 4 methylene hydrogens and one methine hydrogen), and 0.90$\delta$ (broad absorption – 6 methyl hydrogens).

EXAMPLE 3

The conditions of Example 1 were varied with regard to the temperature during reaction, which was raised to 0° from −20°, and to the ratio of sec-butyllithium to M-DVB which was lowered from 1.1 to exactly 1.0. A 0.912 N solution (active and total base) was obtained. The mole percent of the lithium analog of component A [1,3-Bis-(3-Methylpentyl) benzene] was found to have decreased from 97 to 67, while the trilithio analog of component B was found to have increased from 3 mole percent to 33 mole percent.

EXAMPLE 4

Example 2 was repeated using 0.037 moles of sec-butyllithium (in hexane), 0.040 moles of triethylamine, and 0.20 moles of styrene. A dark red, viscous 0.3 N solution was obtained, containing no unreacted sec-butyllithium, and an oligomeric soluble polystyryllithium with a $\overline{DP}$ of 5.5.

EXAMPLE 5

Example 2 was repeated using 0.066 moles of sec-butyllithium in hexane, 0.10 moles of triethylamine, and 0.37 moles of 1,3-butadiene. A deep orange, fluid, 0.68 N solution was obtained, containing no unreacted sec-butyllithium, and an oligomeric soluble polybutadienyllithium with a $\overline{DP}$ of 5.6.

EXAMPLE 6

To a stirred slurry of 5 g of 1,4-distyrylbenzene (0.0177 moles) in 30 ml of benzene there was added, during a period of 15 minutes at room temperature, 28.7 ml of a 1.24 N solution of sec-butyllithium in hexane (0.0355 moles) and 4.6 ml (0.034 moles) of N,N-dimethylaniline. The solution turned a deep red, but little heat was evolved. The solution was checked periodically for unreacted sec-butyllithium. After 18 hours, 93 percent of the sec-butyllithium had reacted yielding a dark red solution containing 0.33 equivalents per liter of carbon-lithium active product. The dicarboxylic acid obtained on carbonation of this solution in dry ice-ether was analyzed by NMR. The NMR spectrum of the diacid in CDCl$_3$ exhibited absorptions as follows: Broad absorption between 6.5–7.8$\delta$ −14 phenyl hydrogens, multiplet centered at 4.14$\delta$–2 methine hydrogens on carbons bearing the 2 COOH groups, doublet of doublets centered at 3.5$\delta$–2 methine hydrogens on carbons attached to both phenyl and sec-butyl groups, broad absorption between 0.5 and 2.1$\delta$—18 aliphatic hydrogens of 2 sec-butyl groups.

The following Examples 7—11 show the use of alkyllithium adducts of this invention as catalysts for anionic polymerizations. All solvents, monomers and glassware were thoroughly dried before use in polymerization. Solvents and monomers were distilled and used immediately afterwards.

EXAMPLE 7

The deep red solution of the sec-butyllithium distyrylbenzene adduct prepared in Example 6 above was used as a catalyst to initiate the polymerization of 1,3-butadiene. 17.6 g of 1,3-butadiene and 120 ml of cyclohexane were added to a 250 ml polymerization bottle. 10 ml of the solution of Example 6 (0.0033 moles) was then added to the contents of the bottle. Polymerization occurred slowly, the original red color of the solution gradually being replaced by the yellow color of the polybutadienylanion. After 3 days, the polymerization was terminated with 1 ml of isopropanol. The product was dried by vacuum distillation to give 19 g of polybutadiene (100 percent conversion). NMR analysis of the polymer showed it to have a molecular weight of 8,250 (ratio of olefinic to aromatic protons). The theoretical molecular weight for polybutadiene catalyzed by a fully difunctional initiator is 10,700.

EXAMPLE 8

12.3 g of styrene and 100 ml of benzene were added to a 250 ml polymerization bottle. 16.5 mmoles of the alkyllithium adduct of Example 1 above was then added to the contents of the bottle. Initiation of polymerization occurred in less than 5 minutes as indicated by heat evolution and a color change from an orange-red to a bright cherry-red. The polymerization was allowed to proceed for 18 hours at room temperature. The difunctional polymer was terminated with 0.5 ml of isopropanol and dried by vacuum distillation. 12.5 g of polystyrene was obtained, indicating 100 percent conversion of monomer to polymer. The number average molecular weight ($\overline{M}_n$) of the polystyrene as determined by vapor pressure osmometry was 14,500. The theoretical molecular weight calculated for polystyrene prepared from a difunctional catalyst was 14,800. Gel permeation chromatography of this polymer showed the molecular weight distribution to be very narrow (1.1 or less) and, thus, essentially monodisperse.

EXAMPLE 9

9.9 g of isoprene and 100 ml of benzene were added to a 250 ml polymerization bottle. 16.5 mmoles of the alkyllithium adduct of Example 1 above was added to the contents of the bottle. Initiation was rapid as indicated by a color change of the solution from orange-red to light yellow. Evolution of heat was noted after about 20 minutes. The polymerization was allowed to proceed for 18 hours at room temperature. The difunctional polymer was terminated with 0.5 ml of isopropanol and 70 mg of antioxidant (N-phenyl-2--naphthylamine) was added. The polymer was dried by vacuum distillation. 10.5 g of polyisoprene was obtained, indicating a 100 percent conversion of monomer to polymer. The number average molecular weight ($\overline{M}_n$) as determined by vapor pressure osmometry was 12,400. The theoretical molecular weight, calculated on the basis of a difunctional initiator, was 12,400. Gel permeation chromatography of this polymer showed the molecular weight distribution to be very narrow (1.1 or less) and, thus, essentially monodisperse. The microstructure of the polymer, as determined by NMR and IR, was 78 percent trans-1,4 and cis-1,4; and 22 percent vinyl.

EXAMPLE 10

13.75 g of 1,3-butadiene and 130 ml of benzene were added to a 250 ml polymerization bottle and 16.5 mmoles of the alkyl-lithium adduct of Example 1 was added. Initiation was rapid as indicated by a change in the color of the solution from an orange-red to a light yellow. Evolution of heat was noted within 20 minutes. The polymerization was allowed to proceed for 18 hours at room temperature and was then terminated with 0.5 ml of propanol. After drying, the polymer weighed 14.5 g indicating 100 percent conversion of monomer to polymer. The number average molecular weight, as determined by osmometry, was 14,000. The theoretical molecular weight, calculated for polybutadiene obtained from a difunctional initiator, was 16,600. Gel permeation chromatography of this polymer showed the molecular weight distribution to be narrow, but containing some low molecular weight tailing. The microstructure of the polymer, as determined by NMR, was 75.5 percent trans- and cis-1,4; and 24.5 percent vinyl.

EXAMPLE 11

A rubbery triblock polymer (SIS) of isoprene (I) and styrene (S) was prepared using the alkyllithium adduct of Example 1. Into a polymerization vessel was placed 250 ml of benzene, 0.385 mmoles of the alkyllithium adduct of Example 1 and 21.0 g of isoprene. After polymerization of isoprene was complete, 9.8 g of styrene was added and the polymerization allowed to continue. The polymerization was finally quenched in isopropanol, the precipitated polymer dried and antioxidant added. The molecular weight ($M_n$) as determined by the formula, $M_s$= grams monomer/0.5 [Initiator] was 160,000. The molecular weight ($\overline{M}_n$) found by membrane osmometry was 170,000. Infra-red analysis of the thermo-plastic elastomer showed the microstructure of the polyisoprene center block to be approximately 65-70% cis-1,4, 20-25% trans-1,4 and 5-10% 3,4. Gel permeation chromatography of a 0.25% solution of the polymer in tetrahydrofuran, using 5 consecutive columns of varying interstitial pore sizes, resulted in a symmetrical molecular weight distribution curve, indicating the presence of an essentially monodisperse product. The tensile strength of a sample of the polymer cast as a clear film from THF solution was found to be 210 kg/cm².

Commercial sources of the reactants can, of course, be utilized in the practice of our invention. Thus, for instance, in the case of m-divinylbenzene, certain commercial sources thereof comprise about 80 percent of a mixture of m- and p-divinylbenzenes and about 20 percent of m-ethylvinylbenzene and p-ethylvinylbenzene. When reacted with the alkyllithiums, the adducts are formed and then any remaining alkyllithium metalates the ethylvinylbenzenes. This, however, does not interfere in any material way with the results which are obtained in the properties of the initiator or in the properties of the polymers.

We claim:

1. A process for preparing a polymerization initiator composition which comprises providing a mixture comprising a $C_2$–$C_{12}$ alkyllithium in a liquid reaction medium selected from at least one member of the group of aliphatic tertiary monoamines possessing no methyl groups, arylalkyl tertiary monoamines and aryl ethers, and gradually admixing therewith, at a low temperature and not substantially exceeding ambient temperature, at least one polymerizable monomer selected from the group of conjugated dienes containing from four to 12 carbon atoms per molecule and vinyl-substituted aromatic compounds whereby polymerization of said monomer is held to a low value, the mole ratio of said monomer to said alkyllithium being from 1 to 100 of said monomer to 1 of said alkyllithium, and the equivalents of said monoamines and/or aryl ethers per equivalent of alkyllithium being in the range of 0.01 to 10.

2. A process according to claim 1 wherein the mole ratio of said monomer to said alkyllithium is 1 to 10 of said monomer to 1 of said alkyllithium, and wherein said liquid reaction medium also includes at least one member of the group of aliphatic, cycloaliphatic and aromatic hydrocarbons.

3. A process according to claim 2 wherein the alkyllithium is sec-butyllithium.

4. A process according to claim 3 wherein the liquid reaction medium is a mixture of at least one aliphatic, cycloaliphatic or aromatic hydrocarbon and said aliphatic tertiary monoamine, said aliphatic tertiary monoamine being present in the range of about 0.2 to about 2 equivalents per equivalent of sec-butyllithium, and said hydrocarbon being present in an amount of about 5 to 100 moles per mole of alkyllithium.

5. A process according to claim 1 wherein the solvent medium consists solely of aliphatic tertiary monoamine possessing no methyl groups.

6. A process according claim 5 in which the aliphatic tertiary monoamine has the formula $R_3N$ where R is an alkyl group containing from two to 12 carbon atoms.

7. A process according to claim 4 in which the aliphatic tertiary monoamine is triethylamine which is present in an amount of from about 0.2 to about 2 equivalents per equivalent of sec-butyllithium, and the hydrocarbon of said reaction medium being n-hexane.

8. A process according to claim 4 in which the arylalkyl tertiary monoamine is dimethylaniline which is present in an amount from about 0.2 to about 2 equivalents per equivalent of sec-butyllithium, and the hydrocarbon of said reaction medium being benzene.

9. A process according to claim 4 in which the hydrocarbon of said reaction medium is cyclohexane.

10. A process according to claim 5 in which the aliphatic tertiary monoamine is triethylamine.

11. A process for preparing a polymerization initiator composition which comprises providing a mixture comprising a $C_2$—$C_{12}$ alkyllithium in a liquid reaction medium containing an aliphatic, cycloaliphatic or aromatic hydrocarbon and at least one member of the group of aliphatic tertiary monoamine having the formula $R_3N$ wherein each R is a $C_2$ to $C_{12}$ alkyl, and arylalkyl tertiary monoamines, and gradually adding thereto, at a temperature in the range of about 0° C to about −30° C, at least one polymerizable monomer selected from the group of conjugated dienes containing from four to 12 carbon atoms per molecule and vinyl-substituted aromatic compounds whereby polymerization of said monomer is held to a low value, the amount of said aliphatic tertiary monoamine being from about 0.2 to 2 equivalents per equivalent of said alkyllithium, the mole ratio of said monomer to said alkyllithium being from 1 to 100 of said monomer to 1 of said alkyllithium, and the mole ratio of said hydrocarbon reaction medium to said alkyllithium being 5 to 100 of said hydrocarbon reaction medium to 1 of said alkyllithium.

12. A process according to claim 11 wherein said monomer is styrene, said aliphatic tertiary monoamine is triethylamine, said hydrocarbon of said reaction medium is n-hexane, and said alkyllithium is sec-butyllithium.

13. A process according to claim 11 wherein said monomer is 1,3-divinylbenzene, said aliphatic tertiary monoamine is triethylamine, said hydrocarbon of said reaction medium is n-hexane, and said alkyllithium is sec-butyllithium.

14. A process according to claim 11 wherein said monomer is 1,4-distyrylbenzene, said alkylaryl tertiary monoamine is dimethylaniline, said hydrocarbon of said reaction medium is benzene, and said alkyllithium is sec-butyllithium.

15. A process according to claim 13 wherein the mole ratio of said sec-butyllithium to said 1,3-divinylbenzene is about 2:1.

16. A polymerization initiator composition comprising a solution, in a liquid medium of at least one member of the group of aliphatic, cycloaliphatic and aromatic hydrocarbons, and, in addition, at least one member of the group of aliphatic tertiary monoamines possessing no methyl groups, arylalkyl tertiary monoamines and aryl ethers, of an adduct of 1 to 100 moles of at least one polymerizable monomer selected from the group of conjugated dienes containing from four to 12 carbon atoms per molecule and vinyl-substituted aromatic compounds with 1 mole of a $C_2$–$C_{12}$ alkyllithium, said initiator composition being substantially free of polymers of said conjugated dienes and/or of said vinyl-substituted aromatic compounds, said composition being essentially free of unreacted alkyllithium.

17. A composition according to claim 16 wherein the mole ratio of said monomer to said alkyllithium is substantially 1 to 2 of said monomer to 1 of said alkyllithium.

18. A composition according to claim 17 wherein the alkyllithium is sec-butyllithium.

19. A composition according to claim 18 wherein said monomer is styrene.
20. A composition according to claim 18 wherein said monomer is 1,3-divinylbenzene.
21. A composition according to claim 18 wherein said monomer is 1,4-distyrylbenzene.
22. An initiator having the structural formula
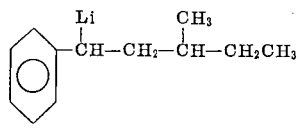
23. An initiator having the structural formula
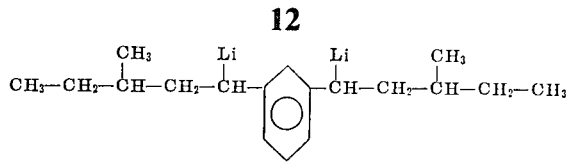
24. An initiator having the structural formula
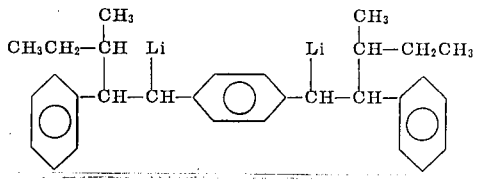
* * * * *

Notice of Adverse Decision in Interference

In Interference No. 98,318, involving Patent No. 3,668,263, R. C. Morrison and C. W. Kamienski, ORGANOLITHIUM POLYMERIZATION INITIATORS AND USE THEREOF IN POLYMERIZATION PROCESSES, final judgment adverse to the patentees was rendered June 17, 1974, as to claim 23.

[*Official Gazette October 1, 1974.*]